June 18, 1935.  T. PETERSEN  2,005,163
PIPE CUTTER
Filed Feb. 19, 1934
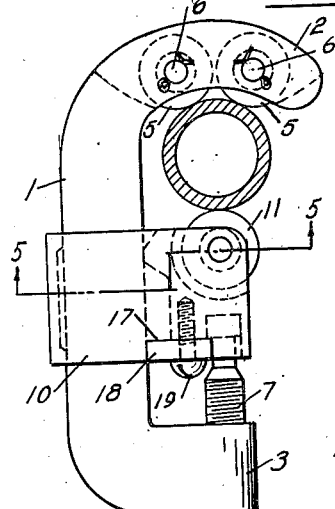
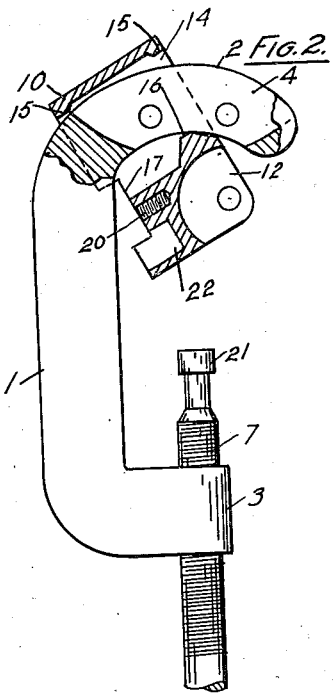
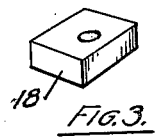
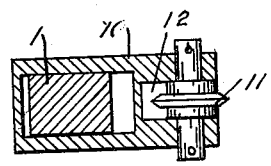
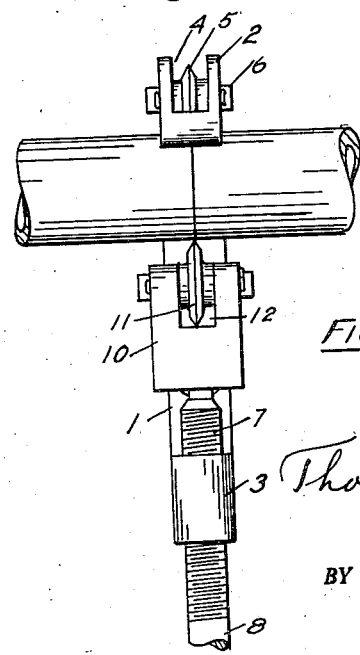
Thorvald Petersen
INVENTOR.
BY
ATTORNEYS.

Patented June 18, 1935

2,005,163

UNITED STATES PATENT OFFICE 2,005,163

PIPE CUTTER

Thorvald Petersen, Erie, Pa., assignor to Reed Manufacturing Company, Erie, Pa., a corporation of Pennsylvania Application February 19, 1934, Serial No. 711,950

4 Claims. (Cl. 81—192)

In forming pipe cutters the common practice heretofore has been to form the guide body and hook end together, assemble the sliding block thereon, and then secure the nut end of the body. In this way the guide block could be readily assembled on the guide portion of the body and the guide portion of the body readily machined.

With the present invention the body and the hook and nut ends are formed integrally, preferably of a forging. The block has a guide opening through it with integral surrounding walls so formed that it can be assembled over the hook end and after the assembly the walls of the opening are supplemented by a plate which completes the guiding surfaces and secures the usual screw to the sliding block. In this way a more rugged tool may be provided than tools made up of several parts and also can be economically produced. Features and details of the invention will appear from the specification and claims.

A preferred embodiment of the invention is illustrated in the accompanying drawing as follows:—

Fig. 1 shows a side elevation of the tool.

Fig. 2 a similar view with the sliding block in section, showing the manner of assembly.

Fig. 3 a perspective view of the guide plate on the sliding block.

Fig. 4 an edge view of the cutter.

Fig. 5 a section on the line 5—5 in Fig. 1.

The body of the cutter comprises the guide portion 1, the hook end 2 and the nut end 3. The hook end has a slot 4 in which are arranged cutting wheels 5. These wheels are journaled on pins 6 arranged in the hook end. A screw 7 operates through the nut end 3 and is provided with an extended shank 8 and cross handle 9 by means of which the screw may be operated and the cutter turned.

A sliding block 10 has a cutter 11 mounted in a slot 12 and journaled on a pin 13. The sliding block has a guide opening 14 through it. The surface 15 of the back wall of the opening forms a complete guide surface for the back of the block. The opposing wall of the block is provided with a guide portion 16 of comparatively limited extent which forms the guide of the hook end of the block on the guide portion 1. By making the opening 14 deeper than the guide portion 1 except at the surface 16 it is possible to assemble the block over the hook end, as indicated in Fig. 2. The nut end of the block is notched at 17 and a plate 18 is arranged in this notch. It is secured by a screw 19 which extends into a screw-threaded socket 20. The end of this plate engages the guide portion 1 of the body and with the guiding surface 16 completes the guiding surfaces of the block along the inner edge of the guide portion of the body. The screw 7 has a head 21 which extends into a socket 22 in the block. The plate 18 engages the rear of the head 21 and locks it in the socket 22.

In machining the cutter the two sides of the body are flat surfaced. The edges of the guide 10 are machined. The opening through the block which is preferably solid is broached and the guide plate completes a perfect fitting guide surface for the block so that a perfect sliding fit is made on the guide portion of the body.

This structure permits of the use of a simple forging for the body giving greater strength and lightness to the tool and in some respects simplifying the manufacture.

What I claim as new is:—

1. In a pipe cutter, the combination of a body having a guide portion with cutter hook and nut ends integral therewith and extending therefrom and at an angle thereto; a cutter block on the guide portion having a guide opening with integral surrounding guide walls, said opening being of a size permitting the assembly of the block over one of the pre-formed ends of the body; and a screw in the nut end operating the block.

2. In a pipe cutter, the combination of a body having a guide portion with cutter hook and nut ends integral therewith and extending therefrom and at an angle thereto; a cutter block on the guide portion having a guide opening with integral surrounding guide walls, said opening being of a size permitting the assembly of the block over the pre-formed hook end of the body; and a screw in the nut end operating the block.

3. In a pipe cutter, the combination of a body having a guide portion with cutter hook and nut ends integral therewith and extending therefrom and at an angle thereto; a cutter block on the guide portion having a guide opening with integral surrounding guide walls, said opening being of a size permitting the assembly of the block over one of the pre-formed ends of the body; a screw in the nut end operating the block; and a detachable member supplementing the walls of the opening in guiding the block on the guide portion.

4. In a pipe cutter, the combination of a body having a guide portion with cutter hook and nut ends integral therewith and extending therefrom and at an angle thereto; a cutter block on the guide portion having a guide opening with integral surrounding guide walls, said opening being of a size permitting the assembly of the block over one of the pre-formed ends of the body; a screw in the nut end operating the block; and a detachable member supplementing the walls of the opening in guiding the block on the guide portion, said member securing the screw to the block.

THORVALD PETERSEN.